United States Patent
Choi et al.

(10) Patent No.: US 8,165,380 B2
(45) Date of Patent: Apr. 24, 2012

(54) METHOD, APPARATUS AND PROGRAM FOR PROCESSING MAMMOGRAPHIC IMAGE

(75) Inventors: Hyung Sik Choi, Seoul (KR); Chang Gun Lee, Seoul (KR)

(73) Assignee: PACSPLUS Co., Ltd., Tokyo (JP)

( * ) Notice: Subject to any disclaimer, the term of this patent is extended or adjusted under 35 U.S.C. 154(b) by 882 days.

(21) Appl. No.: 12/209,047

(22) Filed: Sep. 11, 2008

(65) Prior Publication Data

US 2010/0061613 A1 Mar. 11, 2010

(51) Int. Cl.
*G06K 9/36* (2006.01)
*G06K 9/34* (2006.01)

(52) U.S. Cl. .................... 382/132; 382/128; 382/173

(58) Field of Classification Search .............. 382/131, 382/132, 128, 173; 378/37
See application file for complete search history.

(56) References Cited

U.S. PATENT DOCUMENTS

| | | | | |
|---|---|---|---|---|
| 5,572,565 | A * | 11/1996 | Abdel-Mottaleb | 378/37 |
| 5,999,639 | A * | 12/1999 | Rogers et al. | 382/132 |
| 6,487,271 | B1 * | 11/2002 | Laurent | 378/98.9 |
| 7,668,358 | B2 * | 2/2010 | Snoeren et al. | 382/131 |
| 7,792,348 | B2 * | 9/2010 | Russakoff | 382/132 |
| 7,881,508 | B2 * | 2/2011 | Nakamura | 382/128 |
| 7,881,540 | B2 * | 2/2011 | Neemuchwala et al. | 382/225 |
| 7,885,443 | B2 * | 2/2011 | Zingaretti et al. | 382/128 |
| 7,899,514 | B1 * | 3/2011 | Kirkland et al. | 600/407 |
| 7,907,768 | B2 * | 3/2011 | Russakoff | 382/132 |
| 7,916,912 | B2 * | 3/2011 | Abramov et al. | 382/128 |
| 7,974,378 | B2 * | 7/2011 | Fischer et al. | 378/37 |

FOREIGN PATENT DOCUMENTS

JP 2006-043187 2/2006

* cited by examiner

*Primary Examiner* — Allen C. Ho
(74) *Attorney, Agent, or Firm* — Greenlee Sullivan P.C.

(57) ABSTRACT

Provided are a method, an apparatus, and a program for processing a mammographic image, whereby the file size of the mammographic image can be remarkably reduced while retaining the original breast portion sufficient for diagnosis. A controlling unit divides an original mammographic image into a breast portion and a background portion based on a predetermined value (whether each pixel value of the original mammographic image is greater or smaller than a predetermined value). It determines the breast boundary line between the breast portion and the background portion (operation S2). It shifts and expands the breast portion upward, downward and forward to result in a secondary boundary line, wherein the breast portion side of the secondary boundary line has a size larger than that of the breast portion (operation S3). In addition, the controlling unit cutting off the background portion of the mammographic image vertically and/or horizontally at the secondary boundary line so that the original breast portion side remains, thereby obtaining the finally processed mammographic image (operation S4). Thus, the controlling unit generates the final image smaller in file size than the original mammographic image.

6 Claims, 7 Drawing Sheets

METHOD, APPARATUS AND PROGRAM FOR PROCESSING MAMMOGRAPHIC IMAGE

BACKGROUND OF THE INVENTION

1. Field of the Invention

The present invention relates to mammography, but more precisely, to a method of automatically processing a digital mammographic image, an apparatus, and a program for executing the method.

2. Description of the Related Art

The method disclosed in Japanese Patent Laid-Open Publication No. 2006-43187 is known as the method of processing a mammographic image. In the disclosed method, a mammographic image, which is a digital image taken by computed radiography (CR) or other means, is processed. As illustrated in FIG. 6 of the Japanese Patent Laid-Open Publication No. 2006-43187, a mammographic image usually have broad background portion outside the outline of the breast as it must cover a large range of breast sizes. In many cases with women who have small breasts, the mammographic images represented have remarkably broad portion of background, which are not required for diagnoses.

In a single mammographic examination, there are four mammographic images generated: RCC, LCC, RMLO and LMLO (R: the right breast, L: the left breast, CC: craniocaudal view, and MLO: mediolateral view). In order to detect about 50 micron sized micro calcifications of breast cancer, the file size of a digital mammographic image needs to be huge to ensure high resolution picture or image. In the conventional method of processing a mammographic image, large numbers of mammographic images with broad background portions are stored. The storage capacity of a recording medium is wasted on these not required background portions, and also causes the period of time for transmitting or outputting mammographic images to increase. However, in order to accurately diagnose a breast disease, a mammographic image should have a size within the range of 30 to 130 MB (megabits). Four images of a single mammographic examination should have a size within 120 MB to 520 MB. Future technology development of mammographic modalities will increase the size of the mammographic image with larger number of pixels, the speed of image transfer and display will become slower.

SUMMARY OF THE INVENTION

The present invention provides a method, an apparatus, and a program for processing a mammographic image, in which the size of the mammographic image can be remarkably reduced while still retaining the original portion of the breast image sufficient for diagnosis.

According to an aspect of the present invention, there is provided a method of processing a mammographic image to generate a processed mammographic image of smaller file size than the original one. The method comprises of: 1) dividing an mammographic image into a breast portion and a background portion based on a predetermined value (the higher: the breast portion, the lower: the background portion), drawing a breast boundary line between the breast and the background; 2) shifting and expanding the breast portion upward, downward and forward to result in a secondary boundary line, bigger than the prior breast boundary line; and 3) cutting off the background portion of the mammographic image vertically and/or horizontally at the secondary boundary line, obtaining the processed mammographic image.

The method may further comprising clearing the pixel values of the background portion outside the secondary boundary line to zero.

According to another aspect of the present invention, there is provided an apparatus comprising a control unit which processes to generate a final image smaller than the original one. The control unit: 1) divides an mammographic image into a breast portion and a background portion based on a predetermined value, drawing a breast boundary line between the breast and the background; 2) shifts and expands the breast portion upward, downward and forward to result in a secondary boundary line, bigger than the prior breast boundary line; and 3) cuts off the background portion of the mammographic image vertically and/or horizontally at the secondary boundary line, obtaining the finally processed mammographic image.

The controlling unit may further comprise clearing the pixel values of the background portion outside the secondary boundary line to zero.

According to another aspect of the present invention, there is provided a program to generate a final image smaller than the original mammographic image. The program comprises instructions for: 1) dividing an original mammographic image into a breast portion and a background portion based on a predetermined value, drawing a breast boundary line between the breast and the background; 2) p the breast portion upward, downward and forward to result in a secondary boundary line, bigger than the prior breast boundary line; and 3) cutting off the background portion of the mammographic image vertically and/or horizontally at the secondary boundary line, obtaining the finally processed mammographic image.

The program may further comprise clearing the pixel values of the background portion outside the secondary boundary line to zero.

According to the present invention, a processed image of a mammographic image is generated by cutting off the background portion of image based on a secondary boundary line. The file size of the mammographic image is remarkably reduced, thus improving the speed to store, transmit, and display the mammographic image and enhancing the productivity of diagnoses.

Since pixel values of the background remnant of the final mammographic image are cleared to zero, the size of the mammographic image is further reduced when it is compressed.

BRIEF DESCRIPTION OF THE DRAWINGS

The above and other features and advantages of the present invention will become more apparent by describing detail exemplary embodiments thereof with reference to the attached drawings in which.

DETAILED DESCRIPTION OF THE INVENTION

Figure 1:
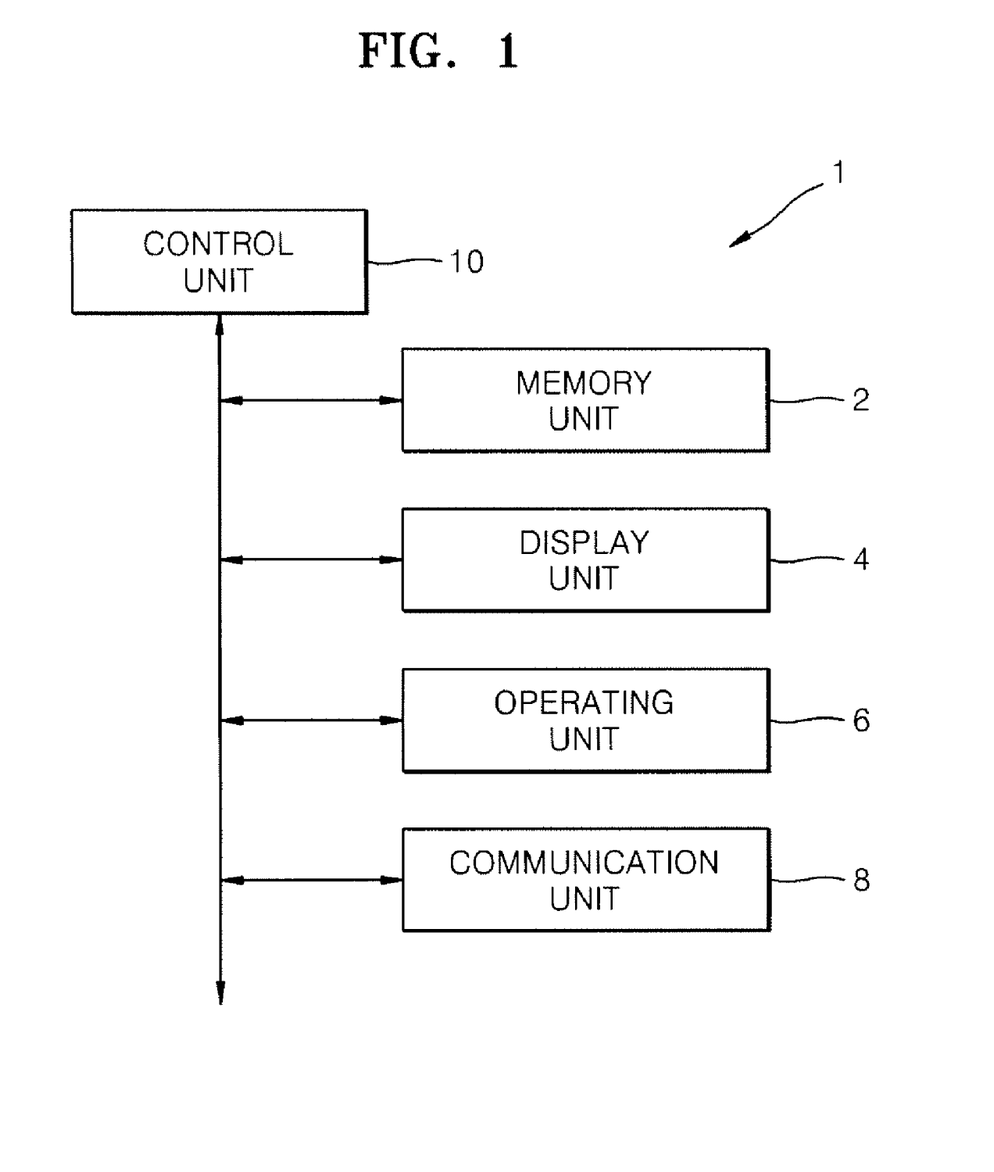
FIG. 1 is a block diagram of a mammographic image processing apparatus according to an embodiment of the present invention.
Figure 2:
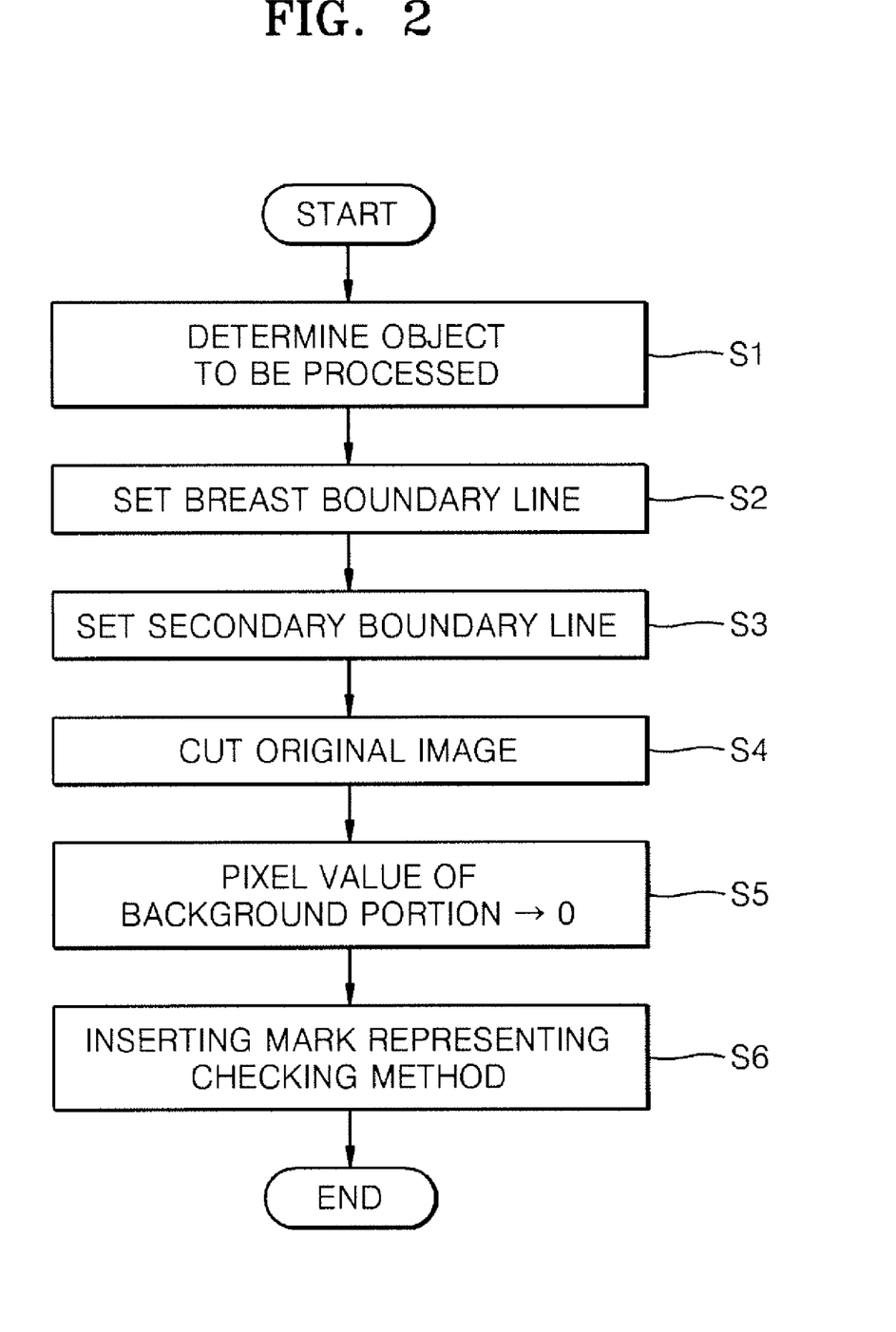
FIG. 2 is a flow chart of a method or program for processing a mammographic image, which is executed in the mammographic image processing apparatus of FIG. 1, according to an embodiment of the present invention.

Hereinafter, a method, an apparatus, and a program for processing a mammographic image will be described with regard to exemplary embodiments of the invention with reference to the attached drawings. FIG. 1 is a block diagram of an apparatus 1 for processing a mammographic image, according to an embodiment of the present invention. FIG. 2 is a flow chart of a method or program for processing a mammographic image, which is executed in the apparatus 1 of FIG. 1, according to an embodiment of the present invention. The apparatus 1 includes a memory unit 2 memorizing various pieces of information, a display unit 4 displaying an image, an operating unit 6 receiving an operator's input, a communication unit 8 communicating with an external apparatus, and a control unit 10 controlling the memory unit 2, the display unit 4, the operating unit 6, and the communication unit 8.

The memory unit 2 includes a hard disk, a removable disk, or a memory device. The display unit 4 includes a liquid crystal display device (LCD) or a cathode ray tube (CRT). The operating unit 6 includes a keyboard or a pointing device (a mouse, a track ball, etc.). The communication unit 8 includes a local area network (LAN) or wide area network (WAN) device. The control unit 10 includes a device performing the functions of a central processing unit (CPU) and a random access memory (RAM).

The program for processing a mammographic image is stored in the memory unit 2. Also, the memory unit 2 stores mammographic images that are already processed or to be processed. The mammographic image is a rectangular digital image so that its pixels are arranged vertically and horizontally. In addition, the mammographic image includes a breast portion shown as a relatively lighter area (high in pixel value) and a background portion shown as a relatively darker area (low in pixel value). The digital mammographic images are obtained from a modalities (i.e., a photographing apparatus) (not shown) via the communication unit 8. The modality may be a computed radiography (CR), a digital mammography, a flat panel detector (FPD), a computed tomography (CT), or a magnetic resonance image (MRI), etc.

In the apparatus 1, the control unit 10 reads and executes the program to perform the method of processing a mammographic image. The control unit 10 first determines an original mammographic image to be processed (operation S1 of FIG. 2). The determination is performed when a request for starting the method is received by the operating unit 6, or when the communication unit 8 receives a new mammographic image to be processed.

Figure 3A:
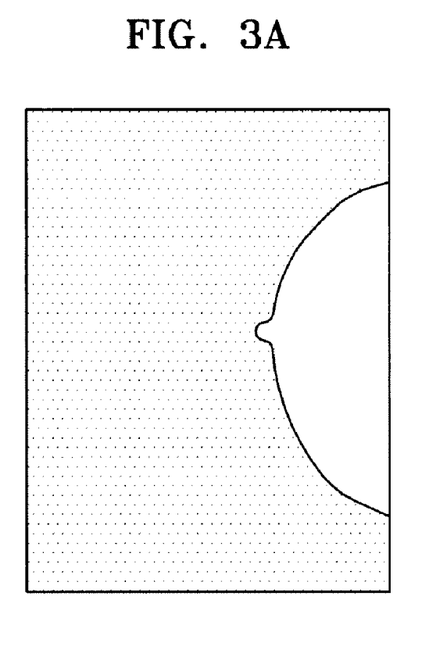
FIG. 3A illustrates a mammographic image which is to be processed, according to an embodiment of the present invention.
Figure 3B:
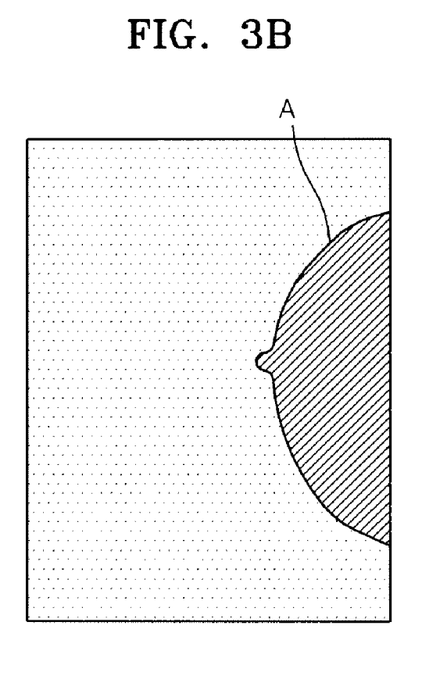
FIG. 3B illustrates a masking image, according to an embodiment of the present invention.

Next, the control unit 10 sets a breast boundary line of the original mammographic image (see FIG. 3A) which is to be processed, and divides the original mammographic image into the breast portion and the background portion (which is referred to as masking, operation S2). Specifically, the control unit 10 performs down sampling of the original mammographic image (i.e., an original image) to generate a sampled mammographic image. When a sampling ratio of the down sampling is 1/2, the sampled mammographic image is reduced to 1/4 of the original mammographic image by reducing both a horizontal and vertical number of pixels to 1/2 of those of the original one. Then, the control unit 10 processes the sampled mammographic image to obtain an image for masking (hereinafter, referred to as a masking image). The masking image illustrated in FIG. 3B is obtained as follows.

A few horizontal lines are scanned from the left to the right and a pixel value of very near transition area from the background portion to the breast portion is obtained as the predetermined minimum value. The predetermined minimum value is significantly lower than an average of pixel values of the breast portion but slightly greater than an average of pixel values of the background portion. Pixel values (i.e., values representing brightness or saturation of pixels) of the sampled mammographic image are sequentially checked. Then, when a pixel value of each pixel of the sampled mammographic image is greater than a predetermined minimum value, a pixel value of a pixel of the masking image is set to 1. When a pixel value of it is equal to or smaller than the predetermined minimum value, a pixel value of a pixel of the masking is set to 0.

A boundary line between a first portion of the masking image (corresponding to the breast portion or a non-mask region) having the pixel value 1 and a second portion of the masking image (corresponding to the background portion or a mask region) having the pixel value 0 is a breast boundary line "A". Thus, the breast boundary line "A" is set by obtaining the masking image.

In addition, the masking image can be obtained by the following program. In the program, the width (the horizontal number of pixels) of the sampled mammographic image is W, the height (the vertical number of pixels) of the sampled mammographic image is H, the predetermined minimum value is Min, a pixel value at a location (x, y) of the sampled mammographic image is P(x, y), and a pixel value at a location (x, y) of the masking image is M(x, y). The origin (0, 0) is an upper leftmost point, the x-axis is directed to the right from the origin (0, 0), the y-axis is directed downwards from the origin (0, 0), and a base portion (i.e., the body center portion) of breast portion is disposed on a right side.

```
for(y=0;y<H;y++)
    for(x=0;x<W;x++)
        if(P(x,y)>Min) then
            M(x,y)=1
        else
            M(x,y)=0
        end if
    end for
end for
```

In addition, the control unit 10 calculates values corresponding to the breast boundary line "A" by using a function of y, E(y) (0≦y≦H), which refers to a distance from a left side of the sampled mammographic image. At this time, the following program is used.

```
for(y=0;y<H;y++)
    for(x=0;x<W;x++)
        if(M(x,y)==1) then
            E(y)=x
```

```
    break;
  end if
 end for
end for
```

Then, the control unit 10 sets a secondary boundary line (operation S3). The secondary boundary line is set as a line that is spaced a predetermined distance apart from the breast boundary line "A" towards to the outside of (left to) the breast portion, i.e., towards the background part. The control unit 10 generates a secondary masking image by expanding the non-mask region of the masking image over the predetermined distance, thereby setting the secondary boundary line. A boundary line between a non-mask region (a breast portion shown bigger than the prior breast portion) of the secondary masking image and a mask region (a background portion shown smaller than the real background portion) is the secondary boundary line.

Figure 4A:
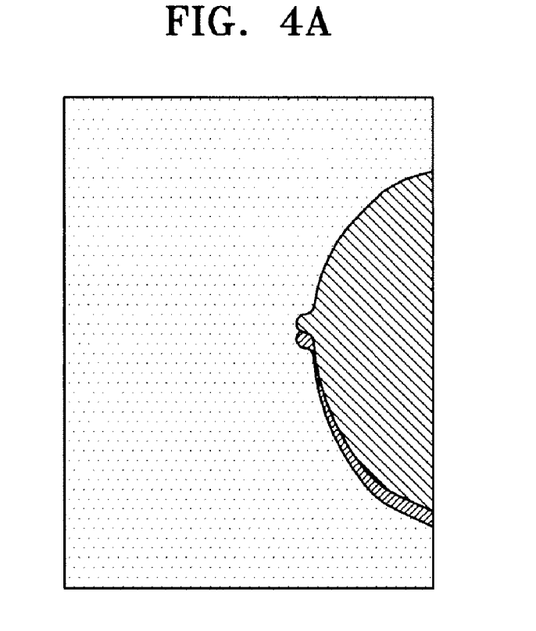
FIGS. 4A through 4C illustrates the method of obtaining a secondary boundary line, according to the embodiment of the present invention.
Figure 4B:
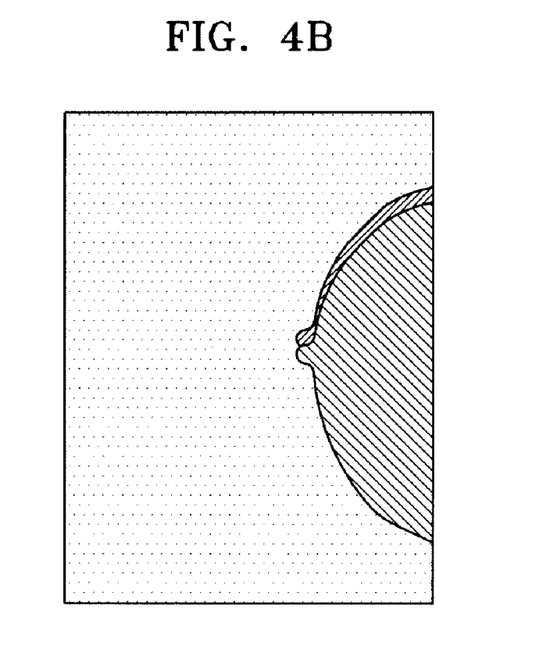
Figure 4C:
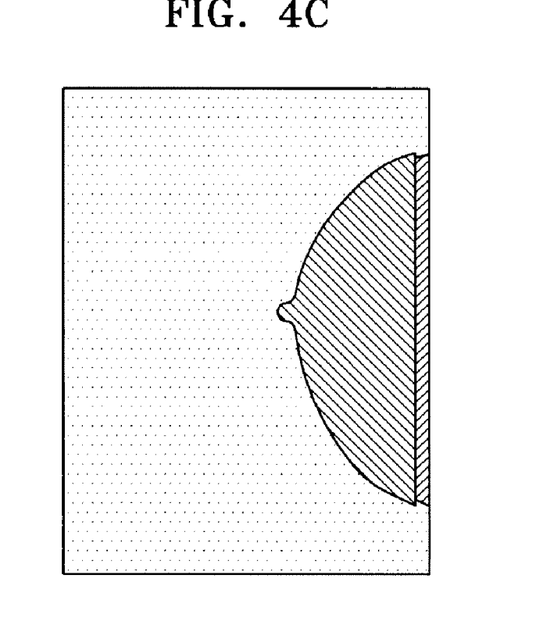
Figure 4D:
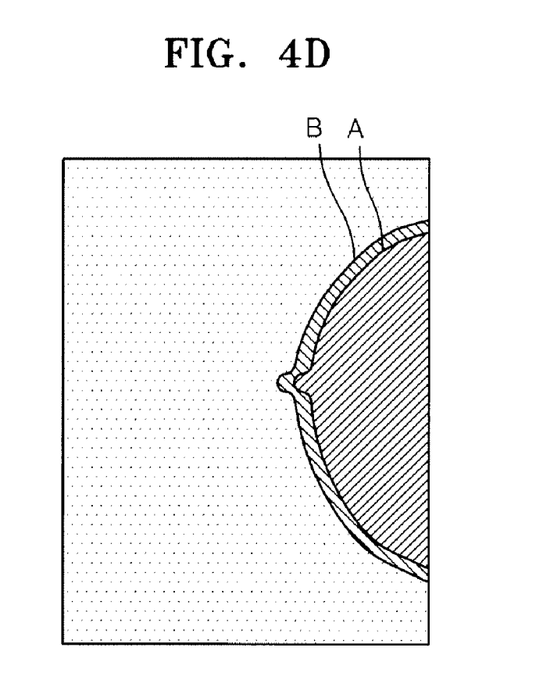
FIG. 4D illustrates a secondary masking image, according to an embodiment of the present invention.

More specifically, in operation S3, the control unit 10 expands the non-mask region of the masking image in an upper direction by a predetermined value corresponding to the predetermined distance (see FIG. 4A). Likewise, the control unit 10 expands the non-mask region of the masking image in lower and left directions by the predetermined value (see FIGS. 4B and 4C). As a result, the secondary masking image illustrated in FIG. 4D is obtained, and a boundary line "B" is obtained which can be used as the secondary boundary line with respect to the original mammographic image. At this time, the following program is used, where the predetermined value is XP (i.e., XP=5 pixels).

```
for(y=0;y<H;y++)
  for(i=0;i<XP;i++)
    M(E(y)-i,y)=1
    M(E(y),y-i)=1
    M(E(y),y+i)=1
  end for
end for
```

Alternatively, in terms of the secondary boundary line of the original mammographic image, the upper, lower, and left portions of the secondary boundary line may be generated by shifting and expanding the breast boundary line in upper, lower, and left directions by the predetermined value corresponding to the predetermined distance.

Then, the control unit 10 cuts the background portion of the original mammographic image, corresponding to the mask region of the secondary masking image, to form a cut image (operation S4). Specifically, the control unit 10 magnifies the secondary masking image four times so as to restore a size of the secondary masking image to the size of the original mammographic image (see FIG. 5A), and the control unit 10 finds left, upper, and lower ends of the non-mask region of that magnified secondary mask image, cuts the original mammographic image vertically or horizontally at left, upper, and lower locations (a line C of FIG. 5B, and lines D and E of FIG. 5C) from the left, upper, and lower ends, respectively, and a remaining part that is not to be cut off from the original mammographic image is defined as the cut image. The following program is used to find the left, upper, and lower ends of the non-mask region of the magnified secondary mask image, where values of the left, upper and lower ends are Xmin, Ymin, and Ymax, respectively. In addition, F(y) is obtained like in the case of the breast boundary line E(y), where F(y) represents a boundary line (i.e., the secondary boundary line) between the mask region and the non-mask region in the magnified secondary masking image that is magnified four times.

Figure 5A:
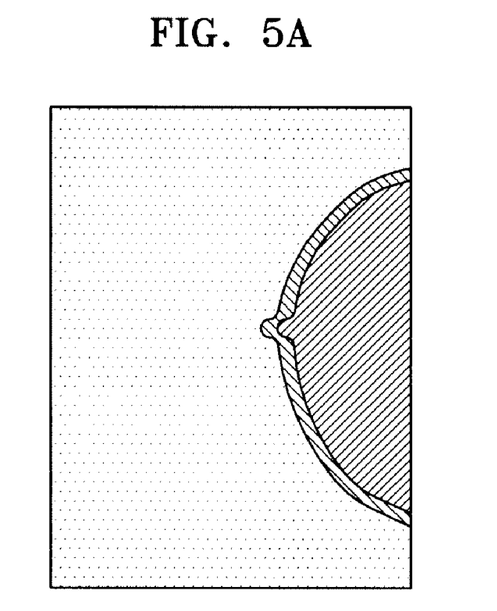
FIGS. 5A through 5C illustrate a method of obtaining a cut image, according to an embodiment of the present invention.
Figure 5B:
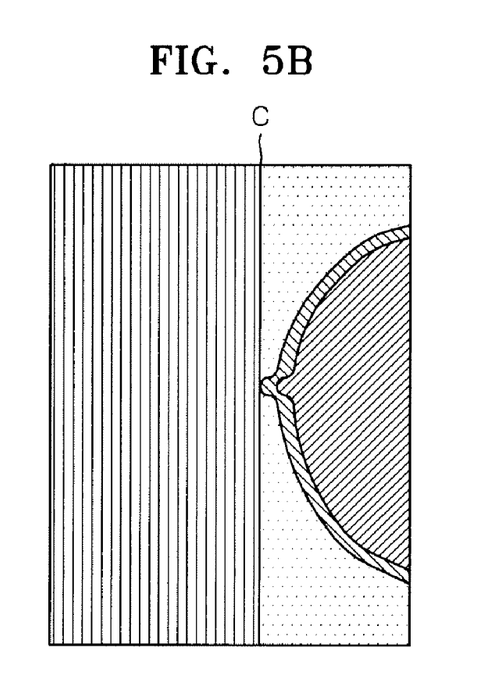
Figure 5C:
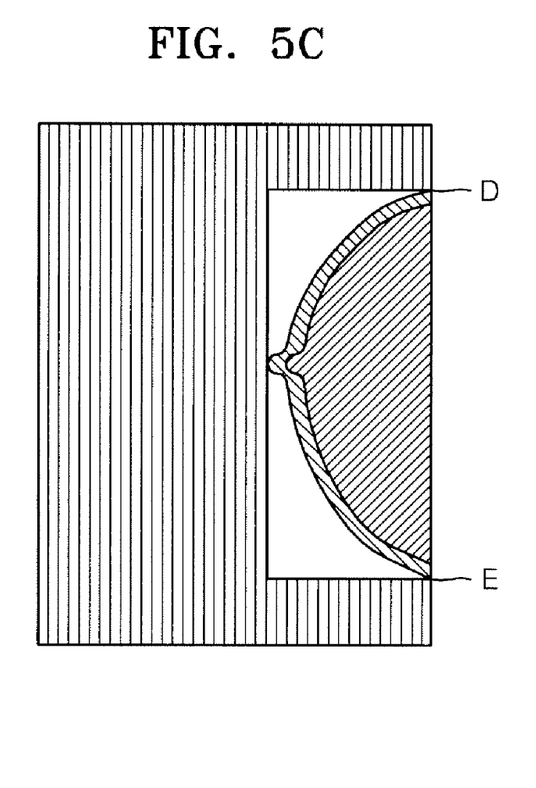

```
Xmin=2*W
Ymin=2*L
Ymax=0
for(y=0;y<H;y++)
  if F(y)<Xmin then
    Xmin=F(y)
  if F(y)!=0 and y<Ymin then
    Ymin=y
  end if
  if F(y)!=0 and y>Ymax then
    Ymax=y
  end if
end for
```

In addition, the control unit 10 changes pixel values of pixels from the background portion of the cut image on the outside of the secondary boundary line into the same pixel value, e.g., a black level to generate a final mammographic image (operation S5). In the cut image, a pixel value of a pixel having an x coordinate smaller than F(y) is set to 0.

Figure 5D:
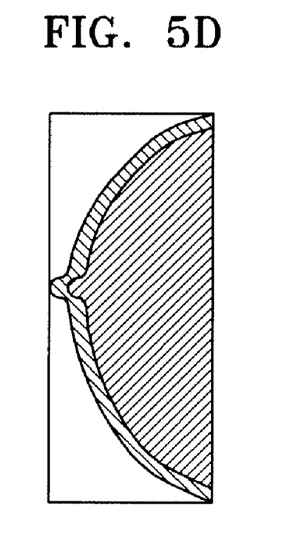
FIG. 5D illustrates a finally processed mammographic image, according to an embodiment of the present invention.

The control unit 10 inserts a mark at the corner of the background remnant of the image, thereby obtaining a finally processed mammographic image (operation S6, FIG. 5D). The mark can be RCC, LCC, RMLO, or LMLO same to the ordinary film printing method. The control unit 10 gets data of header information of the original image, and inserts a necessary mark to the final image.

The control unit 10 stores the finally processed image containing the original header information in the memory unit 2. It can be configured to appropriately keep or remove the original mammographic image from the memory unit 2.

As described above, the control unit 10 divides a mammographic image into a breast portion and a background portion based on a predetermined value (the higher: the breast portion, the lower: the background portion), drawing a breast boundary line between the breast and the background. The breast boundary line is made between the breast portion and the background portion (operation S2). It shifts and expands the breast portion upward, downward and forward to result in a secondary boundary line, bigger than the prior breast boundary line (operation S3).

In addition, the control unit 10 cuts off the background portion of the mammographic image vertically and/or horizontally at the secondary boundary line, obtaining the finally processed mammographic image (operation S4).

CC images can have the background portion out of breast vertically and horizontally, but MLO images can have the background portion only vertically due to the position of breast during examination.

The control unit 10 clears pixel values of the background remnant to zero (operation S5) generating the final image. Its size of storage can be further decreased due to further compression rate.

Since the finally processed mammographic image is smaller than the original one, the file size of image to be stored is remarkably reduced while the breast portion required for diagnosis is retained. It remarkably promotes the speed to store, transmit, and display the mammographic image as well as the productivity of diagnosis.

Hereinafter, another embodiment will be described. The above description is for the image of right breast. The left breast image follows the same method reversely. A sample image of 1/8 or 1/16 size of the original image may be generated to obtain a breast boundary line, or alternatively, the breast boundary line may be generated directly from the original image. Pixel values of a background remnant out of the secondary boundary line of the original image are cleared to zero (black). A mark can be inserted into the background remnant using the header information of the image.

Different programming languages may be used. According to the present invention, the method can be embodied outside or inside of a modality or an apparatus.

While the present invention has been particularly shown and described with reference to exemplary embodiments thereof, it will be understood at clinical environment that various changes in forms and details may be made therein without departing from the spirit and scope of the present invention as defined by the following claims.

What is claimed is:

1. A method of processing an original mammographic image to generate a finally processed mammographic image with a smaller size than the original mammographic image, the method comprising:
   dividing an original mammographic image into a breast portion and a background portion based on a predetermined value, drawing a breast boundary line between the breast portion and the background portion;
   shifting and expanding, by using a control unit, the breast portion upward, downward and forward to result in a secondary boundary line, wherein the breast portion side of the secondary boundary line has a size larger than that of the breast portion; and
   cutting off the background portion of the mammographic image vertically and/or horizontally at the secondary boundary line so that the breast portion side remains, thereby obtaining the finally processed mammographic image.

2. The method of claim 1, further comprising clearing pixel values of the background remnant of the original mammographic image to zero.

3. An apparatus for processing a mammographic image, comprising:
   a control unit to process an original image to generate a processed mammographic image with a smaller file size than an original mammographic image,
   wherein the control unit:
   divides the original mammographic image into a breast portion and a background portion based on a predetermined value, drawing a breast boundary line between the breast portion and the background portion,
   shifts and expands the breast portion upward, downward and forward to result in a secondary boundary line, wherein the breast portion side of the secondary boundary line has a size larger than that of the breast portion, and
   cuts off the background portion of the mammographic image vertically and/or horizontally at the secondary boundary line so that the breast portion side remains, thereby obtaining a finally processed mammographic image.

4. The apparatus of claim 3, wherein the control unit clears pixel values of the background remnant of the original mammographic image to zero.

5. A non-transitory computer-readable medium having instructions being operable to enable a computer to perform a method for processing an original mammographic image to generate a finally processed mammographic image with a smaller size than an original mammographic image, the method comprising:
   dividing an original mammographic image into a breast portion and a background portion based on a predetermined value (whether each pixel value of the original mammographic image is greater or smaller than the value), drawing a breast boundary line between the breast portion and the background portion;
   shifting and expanding the breast portion upward, downward and forward to result in a secondary boundary line, wherein the breast portion side of the secondary boundary line has a size larger than that of the breast portion, and
   cutting off the background portion of the mammographic image vertically and/or horizontally at the secondary boundary line so that the breast portion side remains, thereby obtaining the finally processed mammographic image.

6. The non-transitory computer-readable medium of claim 5, wherein the method further comprises clearing pixel values of the background remnant of the original mammographic image to zero.

* * * * *